J. M. GREEN.
NONSKID CHAIN FOR AUTOMOBILE TIRES.
APPLICATION FILED FEB. 23, 1921.
1,417,055.
Patented May 23, 1922.
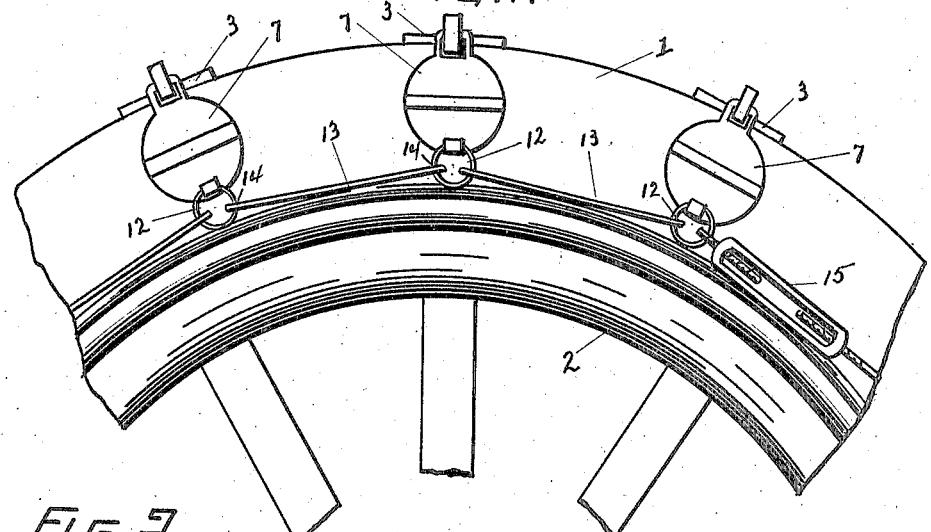
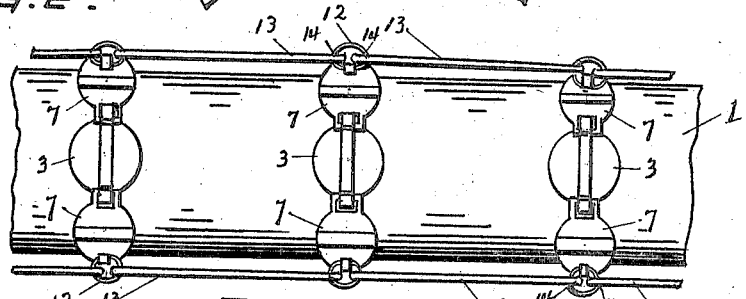
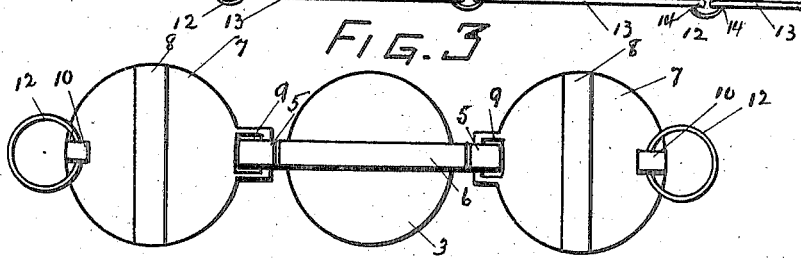
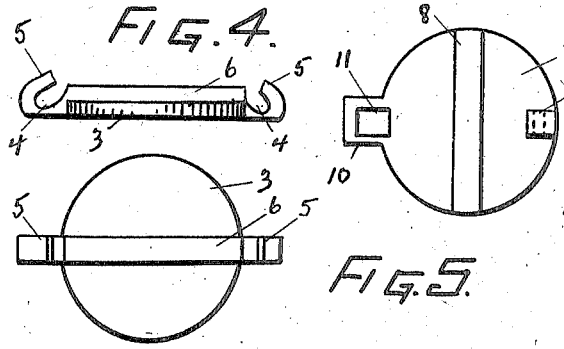
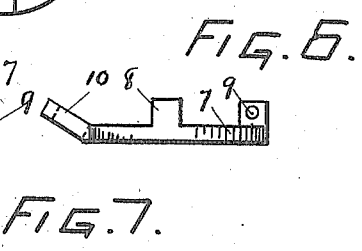

UNITED STATES PATENT OFFICE.

JAMES M. GREEN, OF CHICAGO, ILLINOIS.

NONSKID CHAIN FOR AUTOMOBILE TIRES.

1,417,055. Specification of Letters Patent. Patented May 23, 1922.

Application filed February 23, 1921. Serial No. 447,142.

*To all whom it may concern:*

Be it known that I, JAMES M. GREEN, a citizen of the United States, residing at the city of Chicago, in the county of Cook and State of Illinois, have invented certain new and useful Improvements in Nonskid Chains for Automobile Tires, of which the following is a specification.

My present invention relates to new and useful improvements in non-skid chains for automobile tires and embraces improvements upon and in the manner of applying my former Patent No. 1,348,992.

One object of the present invention is to provide sections composed of non-skid blocks which may be attached across the tread of the tire either to chains as shown in my present invention, or to those employed by others to be used therein as replacement sections.

Another object is to provide non-skid blocks having the holes for attachment to the chains or rings open and adapted to be closed after the rings or chains are placed in position in the holes in assembling.

With the above and other objects in view, which will more particularly appear in the following description, my invention consists of the novel construction, combination and arrangement of parts as illustrated in the accompanying drawings, and described in the accompanying specification.

In the drawings herein in which like numerals of reference designate similar parts throughout the various views, Figure 1 is a side elevation showing a portion of an automobile wheel and tire, with my chain in position thereon.

Figure 2 is a top plan view showing a portion of a tire with my chains in position thereon.

Figure 3 is a short section composed of three non-skid blocks adapted for use in the construction of my said chain, or as replacement sections in other chains.

Figure 4 is a side elevation of one of my non-skid blocks showing the holes open for quick assembling.

Figure 5 is a top plan view of the same.

Figure 6 is a side elevation of one of the non-skid blocks used at the side.

Figure 7 is a top plan view of block shown in Fig. 6.

In the accompanying drawings, 1 represents an automobile tire of any usual make as it is usually mounted upon the rim of a wheel as 2. In the construction and attachment of my non-skid chain, I employ a plurality of non-skid blocks 3, arranged at uniform distances around the periphery of the tire, which said blocks have eyes 4 at their extremities with the hole open for assembling, as shown in Figure 4. After the ring of the adjacent block has been inserted in this eye, the tongue 5 is forced downward by pressure closing the eye and holding the ring against accidental removal. I have made the blocks 3 similar to my prior patent, having the rib 6 running longitudinally thereof forming a calk for engaging the surface of the pavement to hold the tire against skidding, while the inner surface of the block next to the tire is concaved to adjust itself to the tire without affording any rough or sharp edges to cut or wear the tire. In addition to the non-skid blocks 3, I preferably in this present invention employ a new type of non-skid block, as 7, which is preferably made with a rib 8 running crosswise thereof for engagement of the pavement at an angle perpendicular to that of the rib on block 3. At one end of this block 7 I have provided a ring, as 9 adapted to engage the eye 4 of the block 3 for attaching said blocks together. At the other extremity of the block 7 I have provided the upwardly projecting lug 10, having an eye therein as 11 for receiving a ring 12 for attaching said blocks to side chains 13, 13.

I have preferably made the side chains 13, 13 of wire, having the loops 14 at either end thereof, for engagement with the rings 12 holding the transverse sections of the chain carrying the non-skid blocks. These two chains 13, 13 extend circumferentially of the wheel, as shown, one on either side thereof, and at some suitable point are connected together by means of a turnbuckle as 15 for convenience in putting said chain on and taking it off, and to provide means for adjusting said chains to the sizes of various tires.

In the construction of my said non-skid chain, as it will be seen, I employ the two side chains 13, 13, and at suitable intervals connect between said chains sections of blocks containing each one of the blocks 3 and two of the blocks 7 as shown in Figure 3. When the chain is fastened about the tire, the sections between the chains 13, 13, lie transverse of the tread of the tire, with the block 3 about midway thereof, and the blocks 7, 7 upon either side. In this construction, as the tire rolls upon the pavement, it presses the blocks 3 and 7, 7 against the roadway, with the ribs 6 and 8 thereof cutting into the roadway to prevent the tire from slipping or skidding in operation.

While I have herein shown a complete chain, and purpose making and selling it as such, it is apparent that the sections as shown in Figure 3 may be made and used on other makes of tire chains as replacement sections, to replace sections which may be worn or broken off therefrom, by merely connecting said sections across the tire between the opposite side chains usually employed.

While I have shown the eye 11 in the block 7 as being closed, it will be apparent that I may employ an open eye similar to the one used in the blocks 3, and close it after assembling, for convenience in construction, without departing from the spirit of my said invention.

While I have shown my side chains as made of long wires looped at the ends, it will be apparent that any other style of chains may be employed in lieu thereof, which will permit connecting the transverse sections thereto, and hold them in position about the tire.

Having thus described my said invention, what I claim and desire to secure by Letters Patent, is the following:—

1. In a non-skid attachment for automobile tires, side chains and cross chains, the said cross chains comprising a central disc-shaped member having longitudinal ribs thereon projecting beyond the plane of the disc and terminating in open hooks adapted to be closed to lock the central member in position and lying flush with and forming part of the tread surface of said rib when in closed position, a plurality of side disc-shaped members provided with transverse ribs and having integrally cast rigid eyelets adapted to engage the hooks of the central member and means for connecting the cross and side chains.

2. In a non-skid attachment for automobile tires, cross chains and side chains, said cross chains composed of central and side disc-shaped members having ribs thereon, the ribs on the central members terminating in hooks lying beyond the plane of the disc, the said side members having eyelets cast integrally therewith and extending obliquely upwardly for engagement with the hooks on the central rib, a vertical lug carried by the side disc having an opening therein and a ring for connection to the side chains journalled in the said opening.

3. In a non-skid attachment for automobile tires, side chains and cross chains, the said cross chains comprising a central disc-shaped member having longitudinal ribs thereon projecting beyond the plane of the disc and terminating in open hooks adapted to be closed to lock the central member in position and lying flush with the surface of said rib when closed, a plurality of side disc-shaped members provided with transverse ribs and having eyelets adapted to engage the hooks of the central member and means for connecting the cross and side chains.

In testimony whereof, I have duly signed the foregoing specification, in the presence of two subscribing witnesses.

JAMES M. GREEN.

In presence of—
   CHESTER W. BROWN,
   CHARLES H. KNIGHT.